Patented Sept. 30, 1952

2,612,448

UNITED STATES PATENT OFFICE 2,612,448

PHOTOGRAPHIC ELEMENTS CONTAINING AZO DYES AND PROCESS USING THEM

Béla Gaspar, Beverly Hills, and Paul Daniel Dreyfuss, Van Nuys, Calif., assignors, by mesne assignments, to said Gaspar No Drawing. Application April 2, 1948, Serial No. 18,714

15 Claims. (Cl. 95—6)

This invention relates to color photography, and particularly to azo dyes for incorporation in photographic layers. Processes of color photography depending upon the decolorization of dyes in the presence of metallic silver are well known. A process of this type in which azo dyes are employed in multi-layer coatings to produce colored images by bleaching the dyes in the presence of silver images is disclosed in a number of patents, i. e., U. S. Patent 2,020,775. In this process azo dyes are uniformly distributed in photographic colloids, preferably gelatin-silver halide emulsions, and these are coated on a transparent or opaque support. The material is exposed and developed, and is then subjected to the action of a bath which destroys the dye locally in the presence of the metal deposit of the photographic image. This results in the production of a dye image which is reversed with respect to the metal image.

An azo dye must fulfill a number of requirements in order to make it useful for color photographic purposes. Some of these conditions are: The dyes must be stable to photographic processing baths, and the spectral qualities of the dyes must satisfy certain requirements. A survey of the heretofore known azo dyes shows the remarkable fact that the number of brilliant azo dyes which absorb the blue or the green light is quite large, but that there are only a very limited number of brilliant azo dyes which absorb in the longer wave range of the visible spectrum. Most of the dyes which absorb in the longer wave range are found in the group of those azo dyes which contain an accumulation of several azo groups. This accumulation, in most cases, has the consequence that, besides a shift of the absorption maximum to longer wave lengths, the absorption band is broader; that is, the dye becomes dull or blackish.

It is, therefore, an object of the present invention to provide photographic layers containing magenta, violet and blue dyes which are fast to light and have desirable spectral characteristics. It has been found that the dyes of the general formula A'—N=N—B—N=N—A are very valuable for color photographic purposes. In this general formula B stands for an aromatic residue carrying the azo bonds shown in 1,4-position, and A and A' stand for azo coupling components having in the 2- or 4-position to the azo group a hydroxy, amino, monoalkylamino or arylamino radical. The residue B, according to this definition, can be, e. g., a para phenylene or a 1,4-naphthylene residue which may carry such substituents as halogen, alkyl, alkoxy or substituted alkoxy groups, aryloxy groups, or solubilizing groups such as sulfonic acid or carboxyl groups, or combinations of these substituents. It has been found that dyes in which the residue has ether substituents, such as alkoxy, substituted alkoxy and aryloxy groups, are exceptionally well suited for the invention. The residues A and A' represent the residues of benzene, naphthalene, pyrazolone and the like, having in the 2- or the 4-position to the azo group, a hydroxy, an amino, a monoalkylamino or an arylamino group. Coupling components A and A' which contain a hydroxy group in the 2- or 4-position to the azo group are most preferred. These residues A and A' may contain further substituents such as halogen, hydroxy, alkoxy amino, alkylamino, arylamino, acylamino, sulfonic acid, and carboxyl groups, and they may contain one or more further azo groups. Aminonaphtholsulfonic acids, preferably derivatives of 1,8 aminonaphthols, such as H, K and S-acid, at least one of which carries an N-acyl group, have been found to produce exceptionally suitable dyes when used as the coupling components A and A'.

These dyes are exceptionally bright and of a great brilliance of hue, and the absorption curves of these dyes have a very steep increment. They dye gelatin to excellent cyan, blue, violet and magenta colors of great clarity and excellent stability. They bleach with great ease in the presence of agents which form reducing compounds by reaction with the metallic silver deposit. Suitable agents for this bleaching process are described in U. S. Patent 2,020,775 and subsequent patents such as Re. 22,308 and 2,410,025.

It is remarkable that dyes of the indicated structure proved so valuable. It is particularly surprising to find brilliant and stable cyan dyes in this class of comparatively simple compounds. Most of the cyan azo dyes so far known are tris or tetrakis azo dyes. Those known cyan azo dyes which are of a more simple structure, as e. g., the cyan mono-azo dyes, are pH sensitive or they are cyan only if they are dissolved in certain organic solvents. It could not be predicted that the dyes of the present invention, even when they contain only the number of azo groups shown in the above formula, would have all the properties required for color photographic application. This unexpected result supposedly is due to the presence of the resonance system

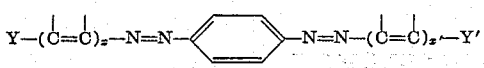

where $x$ and $x'$ represent one of the integers 1 or 2, and where Y and Y' represent a hydroxy, an amino, a monoalkyl amino or arylamino. For instance, in the dye of Example 2 below, the resonance system

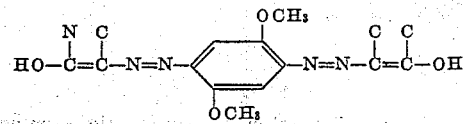

is present.

Some dyes of this group do not diffuse, which means they do not wander through set gelatin. Others which do diffuse can be transformed into insoluble salts, i. e., by addition to the gelatin of organic bases according to U. S. Patents 2,046,067, 2,317,184 or 2,368,647.

The following four methods may be employed in the preparation of the dyes:

1. One mol of a para-tetrazo compound is coupled with two mols of an azo coupler.

2. One mol of a para-amino diazo compound is coupled with one mol of an azo coupler. The resulting amino azo dye is diazotized and coupled with one further mol of an azo coupler. The second azo coupler may be identical with or differ from the first azo coupler.

3. One mol of a para-acyl amino diazo compound is coupled with one mol of an azo coupler. The acylamino azo dye thus formed is hydrolyzed to give an amino azo dye which is diazotized and coupled with one further mol of an azo coupler.

4. The amino azo dye used as intermediate in the methods 2 and 3 can be prepared by coupling one mol of a para-nitro diazo compound with one mol of an azo coupler and then reducing the resulting nitroazo dye.

The use for photographic purposes of azo dyes which are prepared by coupling tetrazonium salts with phenols or with alpha-naphthols is already known. However, the tetrazo compounds heretofore used are derived from bicyclic diamines containing the two amino groups in separate rings. The dyes used according to our invention are different from those already used, because they contain the azo groups in the same ring.

There are other disazo dyes known for photographic purposes which differ from the dyes used according to our invention by lacking in one of the terminal components of a free hydroxyl, amino, monoalkylamino or arylamino group, in 2- or 4-position to the azo group.

Diazo or tetrazo compounds suitable for use in the production of the dyes used in the present invention can be obtained by diazotation or tetrazotation respectively of amino compounds, of which the following are some examples:

1,4-phenylenediamine
5-nitro-2-amino-p-xylene
2,6-dichloro-4-nitraniline
3-bromo-5-nitro-2-aminotoluene
4-acetylaminoaniline-2-sulfonic acid
4-nitraniline-2-diethylsulfonamide
5-nitro-2-aminobenzylsulfonic acid
1,4-naphthylenediamine-2-sulfonic acid
4-nitro-1-naphthylamine-6-sulfonic acid
5-nitroanthranilic acid
ethyl-(5-nitro-2-aminophenyl)-sulfone
4-acetylamino-5-methoxyaniline-2-sulfonic acid
2-benzyloxy-5-chloro-4-nitraniline
4-nitraniline-2-oxyacetic acid, its esters and amides
2,5-dimethoxy-4-nitraniline
4 - oxalylamino-2,5-di-(2'-hydroxyethoxy)-aniline, its esters and ethers
1 - oxalylamino-2-ethoxy-4-naphthylamine - 7 - sulfonic acid
2-amino-5-nitrodiphenyl ether Other examples are readily apparent to one skilled in the art.

The diazonium and tetrazonium salts prepared from these amines are combined with azo couplers. From the many types of suitable azo couplers, we may mention the following:

Acetoacet-o-chloroanilide
Phenol
p-cresol
1-methyl-2,4-dioxo-1,2,3,4-tetrahydroquinoline
Alpha-naphthol
Beta-naphthol
Methylaniline
2-methylindole
3-benzoylaminophenol
5-aminophenol-2-sulfonic acid
1-(4-sulfophenyl)-pyrazolone - (5) - 3 - carbonic acid (tartrazinogenic sulfonic acid)
1-naphthol-7-sulfonic acid
2-naphthol-3,6-disulfonic acid (R-acid)
1,8 - dihydroxynaphthalene-3,6 - disulfonic acid (chromotropic acid) chromotropic acid monoethyl ether
8-chloro-1-hydroxynaphthalene - 3,6 - disulfonic acid
1-naphthylamine-6-sulfonic acid (Cleve acid)
1-anilinonaphthalene-8-sulfonic acid (phenyl-Schöllkopf acid)
2-ethylaminonaphthalene-6-sulfonic acid (ethyl-Brönneer acid)
6-amino-1-naphthol-3-sulfonic acid (J-acid)
8-amino-1-naphthol-5-sulfonic acid (S-acid)
8-amino-1-naphthol-3,5-disulfonic acid (K-acid)
8-amino-1-naphthol-3,6-disulfonic acid (H-acid)
5-amino-1-naphthol-3-sulfonic acid (M-acid)
8-amino-1-naphthol - 5,7 - disulfonic acid (SS-acid)
7-amino-1-naphthol-3-sulfonic acid (gamma-acid)
N-(phenyl-J-acid)
N-(p-toluenesulfo)-K-acid
N-(2,4-dichlorobenzoyl)-K-acid
5-(p-sulfophenylazo-)-6-amino - 1 - naphthol - 3-sulfonic acid
N-(p-aminophenylacetyl-)-H-acid
N-(2-aminoethyl)-gamma-acid
N-(3-chloro-2-hydroxy-n-propyl)-J-acid The disazo dyes obtained from these components can be further treated, e. g., those dyes having free amino groups (besides those amino groups in ortho or para position to the azo groups), may be acylated by the action of mono or polycarbonic acid chlorides, anhydrides, sulfochlorides or other acylating agents, such as acetic anhydride, phthalyl chloride, naphthalene-1,5-disulfochloride, ketene, etc., or they may be diazotised and coupled with azo couplers, or they may be treated with phosgene or with aldehydes. The treatment with phosgene, aldehydes, e. g., formaldehyde and its equivalents, or with one of the mentioned polyvalent acid chlorides results in dyes of the following general formula

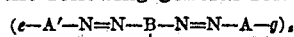

where at least one of $e$, $f$ and $g$ represents any external linkage and the remainder stand for hydrogen, and $z$ stands for a whole number greater than one. Dyes of this type have high molecular weights, but all of the products which are formed by reductive splitting of the azo groups have low molecular weights. The essential advantage of this building principle is that the dyes do not diffuse, and that they break down in the dyebleach into compounds which are easily washed out from the photographic colloid.

It is obvious that any two nuclei of two dye molecules can be linked in the same way as is done with the nuclei A and A' in the formula above. Suitable reactive groups in a monomeric dye molecule permit linking of two nuclei A—B or of two nuclei B—B by means of an external bond. It is possible in some cases to have the external bond preformed before the coupling takes place. In most cases, however, it is preferable to link the finished monomeric disazo dye, as it is easier in this manner to arrive at a pure end product.

Suitable external linkages are: —CO—, —CS—, —, —CX₂— (where X is hydrogen, alkyl or aryl), —SO₂—, —S—, —NX—, —O—, —R— (where R is a bivalent hydrocarbon residue), —NH—CO—NH—, —NH—CS—NH—
—NH—R—NH—, —NH—SO₂—R—SO₂—NH—
—NH—CO—R—CO—NH—, —O—P(OH)—O—
—SO₂NH—, —R—O—, —NH—CO— and the like. These external linkages or heteronuclear bonds bind several azo units together without changing essentially the color of the corresponding monomeric dyes, as the resonance system is interrupted by said bonds. For example, the dye (e—A'—N=N—B—N=N—A)z has the optical properties of a disazo dye, even if Z is a large number. Some of the mentioned linkages such as —SO₂— are preferably present in the starting materials from which the dyes are prepared. Other linkages such as

—NH—CO—NH— are brought upon by the reaction of monomeric dyes containing a suitable reactive terminal group such as an amino or hydroxy group with suitable reagents such as phosgene. If the monomeric dye has two or more reactive terminal groups, it is possible to connect any desired number of dye units, as is described in the Patent No. 2,470,769.

The following examples illustrate further the color photographic application of our invention:

*Example 1*

The dye

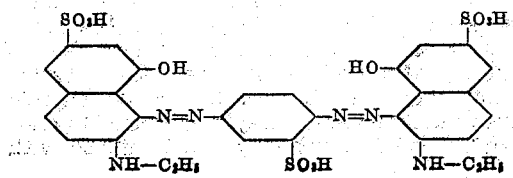

is obtained by diazotizing p-nitraniline-o-sulfonic acid, coupling in acid solution with N-ethyl-gamma-acid, reducing in alkaline solution with sodium sulfide, diazotizing, and coupling again with N-ethyl-gamma-acid. The dye, after suitable purification to remove by products, is ready for use in color photography. The sodium salt of the dye is very water soluble, which facilitates incorporation in photographic emulsion layers, and also causes little or no desensitization of the emulsion. In addition, the dye is quite stable to light and has excellent color characteristics. It is a vivid blue-green, absorbing nearly no light at a wavelength of 500 mu, and the density even at 570 mu being less than half of what it is beyond 620 mu. Its diffusion can be prevented by addition to the emulsion of the base described in Example 2 of U. S. Patent 2,317,184. The dye bleaches very well in the presence of a silver image, leaving no stain.

If, in the above example, the N-ethyl-gamma-acid is replaced by a N-alkyl-gamma-acid with a long alkyl chain, such as hexadecyl-gamma-acid, the dye becomes non-diffusing, rendering unnecessary the presence of a precipitating agent, without harming its other qualities.

It is further possible to replace one or both ethyl-gamma-acid units in the above dye with N-(2-aminoethyl)-gamma-acid. The dyes thus obtained, which contain one or two terminal aliphatic amino groups, can be reacted with aldehydes, isocyanates such as phenyl isocyanate, carbonyl chloride, acid chlorides and other compounds in order to arrive at non-wandering dyes.

*Example 2*

The dye

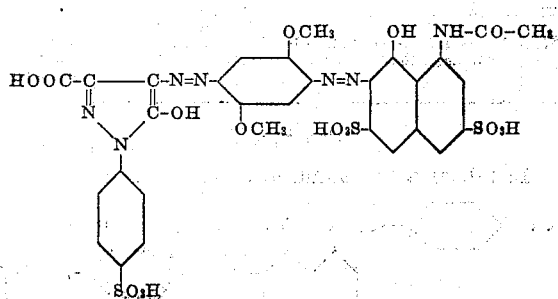

is obtained in the following way: 2-amino-5-nitrohydroquinone dimethyl ether is diazotized and coupled with acetyl-H-acid. The dye obtained is reduced with sodium sulfide or with ferrous sulfate in alkaline solution, diazotized and coupled in aqueous pyridine with 1-(4-sulfophenyl)-pyrazolone-(5)-3-carbonic acid (tartrazinogenic sulfonic acid). It dyes the gelatine emulsion a brilliant blue-green shade, bleaches very well, and has practically no desensitizing effect on a red sensitive emulsion. The diffusion of the dye in the above example can be practically eliminated by varying its constituents in a suitable manner. One mol of tartrazinogenic acid in the above example can be replaced by half a mol of 1,1'-[2,2'-disulfo-diphenylene-(4,4')]-bis-[pyrazolone-(5)'-carbonic acid-(3)] and/or one mol of acetyl-H-acid in the above described dye can be replaced by one-half mol of adipyl-bis-H-acid, by one mol of heptanoyl-K-acid or by one mol of octanoyl-J-acid.

Example 3

Some further dyes are listed in the following table:

| No. | A'—N=N— | B | —N=N—A | Color |
|---|---|---|---|---|
| 1 | 8-p-toluene-sulfonylamino-1-hydroxy-3,6-disulfo-naphthalene-2-azo. | 1,4-phenylene. | 8-p-toluene-sulfonylamino-1-hydroxy-3,6-disulfo-naphthalene-2-azo. | blue. |
| 2 | ...do... | 2,6-dichloro-1,4-phenylene. | ...do... | blue-violet. |
| 3 | ...do... | 6-sulfo-1,4-naphthylene. | ...do... | blue-green. |
| 4 | ...do... | 2,5-diethoxy-1,4-phenylene. | ...do... | Do. |
| 5 | ...do... | ...do... | 2-naphthol-1-azo. | Do. |
| 6 | ...do... | ...do... | 2-hydroxy-3,6-disulfonaphthalene-1-azo. | Do. |
| 7 | ...do... | 1,4-phenylene. | 8-amino-1-hydroxy-5-sulfonaphthalene-2-azo. | blue. |
| 8 | ...do... | ...do... | 6-amino-1-hydroxy-3-sulfo-5-(2',5'-dichlorophenyl-azo)naphthalene-2-azo. | Do. |
| 9 | ...do... | 2,5-dimethoxy-1,4-phenylene. | 1-hydroxyphenyl-4-azo. | violet. |
| 10 | ...do... | ...do... | 1-hydroxy-5-amino-2-sulfo-phenyl-4-azo. | blue. |
| 11 | ...do... | ...do... | 1-hydroxy-3-(3'-sulfobenzoyl or 3'-carboxylbenzene-sulfo)-phenyl-4-azo. | Do. |
| 12 | ...do... | ...do... | 6-phenylamino-1-hydroxy-3-sulfonaphthalene-2-azo. | blue-green. |
| 13 | ...do... | ...do... | 1-amino-7-sulfonaphthalene-4-azo. | Do. |
| 14 | ...do... | ...do... | 1-hydroxy-6(8'-p-toluene-sulfonylamino-1'-hydroxy-3',6'-disulfonaphthalene-2'-azo-)-3-sulfonaphthalene-2-azo. | Do. |
| 15 | 2-hydroxy-3,6-disulfonaphthalene-1-azo. | 3-sulfo-1,4-naphthylene. | 1-hydroxynaphthalene-4-azo. | blue. |
| 16 | 1-phenylamino-8-sulfonaphthalene-4-azo. | 1,4-phenylene. | 1-phenylamino-8-sulfonaphthalene-4-azo. | violet. |
| 17 | 1-(4-sulfophenyl)-pyrazolone-(5)-3-carbonic acid-4-azo. | ...do... | 1-(4-sulfophenyl)-pyrazolone-(5)-3-carbonic acid-4-azo. | magenta. |
| 18 | 1,8-dihydroxy-3,6-disulfonaphthalene-2-azo. | 2-sulfo-1,4-naphthylene. | 1,8-dihydroxy-3,6-disulfonaphthalene-2-azo. | blue. |
| 19 | 2-hydroxynaphthalene-1-azo. | 1,4-phenylene. | 2-hydroxynaphthalene-1-azo. | magenta. |
| 20 | 1-hydroxy-8-chloro-3,6-disulfonaphthalene-2-azo. | 1,4-phenylene-2,5-(dioxyacetic acid). | 1-hydroxy-8-chloro-3,6-disulfonaphthalene-2-azo. | blue-green. |
| 21 | 2-amino-8-hydroxy-6-sulfonaphthalene-1-azo. | 3-sulfo-1,4-phenylene. | 1-hydroxy-phenyl-4-azo. | purple. |
| 22 | ...do... | 2-sulfo-5-methoxy-1,4-phenylene. | 1-methylamino-phenyl-4-azo. | blue. |
| 23 | 2-ethylamino-8-hydroxy-6-sulfonaphthalene-1-azo. | 2,5-dichloro-1,4-phenylene. | 2-(3'-chloro-2'-hydroxy-n-propyl)-amino-8-hydroxy-6-sulfonaphthalene-1-azo. | Do. |

Example 4

12 ml. of a 2% solution of the dye

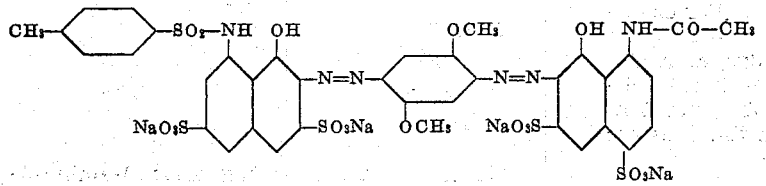

and 8 ml. of a 3% solution of diphenylenedibiguanide acetate (U. S. Patent 2,368,647) are incorporated into 100 ml. of an ordinary silver halide gelatin emulsion. The whole is thoroughly mixed at 40° C. with due precaution that the precipitated dye does not separate out. The resultant emulsion is sensitized to red light by addition of a suitable sensitizer, coated on an opaque support and used for the bottom layer of a multi-layer material.

The dye in the above example can be prepared by coupling 2-oxalylamino-5-amino-hydroquinone dimethyl ether with p-toluenesulfo-H-acid, splitting off the oxalyl group, and coupling the resulting amino azo dye with acetyl-K-acid.

If the methyl radicals in the methoxy groups of the above dye are replaced by other radicals, e. g., butyl, hexyl, benzyl or aromatic radicals, the resulting dyes become less diffusing, and with some suitable radicals the presence of a precipitating agent in the gelatin emulsion becomes unnecessary. The same result can be reached by modifying the acyl radicals in the azo coupler components of the above dye, i. e., the toluene-sulfo-H-acid and the acetyl-K-acid can be replaced by heptanoyl-H-acid, sebacyl-bis-H-acid, 2,4-dichlorobenzoyl-H-acid, octanoyl-K-acid and the like. It is remarkable that even the dyes containing long chain aliphatic substituents are quite water soluble, of a good brilliancy, and bleach to a pure white where a silver image is present.

If, in the dye of the above example, acetyl-J-acid replaces acetyl-K-acid, and H-acid (or S-acid or SS-acid) replaces toluenesulfo-H-acid, a dye results which likewise has a very brilliant blue-green color, and bleaches very well.

In addition to their use in emulsion layers as described, the dyes as defined in the following claims are equally suitable for use in light screening layers. These dyes can be employed in filter overcoats or interlayers, in photographic films, plates or paper. They can be used to dye up finished gelatin layers by bathing in the dye solution, or they can be used to dye up organic resins which afterwards may be dispersed in photographic colloids, and they can be mixed with unsensitized emulsions or with emulsions which are sensitized to any color. For example, the dyes proposed according to our invention may be incorporated in any or all desired layers of a multi-layer coating. The sensitive compositions containing these dyes may be coated on transparent film supports such as a derivative of cellulose including cellulose esters and cellulose ethers, as well as on synthetic resin supports such as polyvinyl acetal and opaque supports such as paper or cellulose derivatives mixed with opaque white pigments. They may be used in single layer or multi-layer coatings, or in multi-layer coatings on one or both sides of a support.

Dyes of the general structure which we have described, have remarkably brilliant shades and have little adverse effect upon the sensitivity of the emulsion in which they are incorporated or on adjacent emulsion layers. They can be destroyed in the presence of a silver image with suitable bleaching solutions, such as described in U. S. Patents 2,020,775, 2,410,025 and others, and when used in filter layers they can be discharged by reduction.

Other variations of our invention are possible, and it is to be understood our invention is to be considered as limited only by the scope of the appended claims.

We claim:

1. A photographic material having at least one light sensitive silver halide layer, comprising a colloid layer dyed with a dye having the general formula

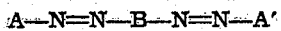

wherein B is a member selected from the group consisting of monocyclic and polycyclic aromatic residues in which the azo bonds shown stand in the 1, 4 position of said aromatic residue, and wherein A and A' are residues of azo coupling components, which azo coupling components carry a substituent selected from the group consisting of hydroxy, amino, monoalkylamino and arylamino radicals, which substituent is in a position selected from the group consisting of positions 2 and 4 with respect to the azo group.

2. A photographic material having at least one light sensitive silver halide layer, comprising a colloid layer dyed with a dye having the general formula

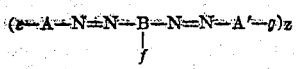

wherein B is a member selected from the group consisting of monocyclic and polycyclic aromatic residues in which the azo bonds shown stand in the 1, 4 position of said aromatic residue, wherein A and A' are residues of azo coupling components, which azo coupling components carry a substituent selected from the group consisting of hydroxy, amino, monoalkylamino and arylamino radicals, which substituent is in a position selected from the group consisting of positions 2 and 4 with respect to the azo group, and wherein $e$, $f$, and $g$ are selected from the group consisting of hydrogen and external linkages and $e$ and $g$ are in positions other than the 2 and 4 position with respect to the azo groups and wherein Z represents an integer.

3. A photographic material having at least one light sensitive silver halide layer, comprising a colloid layer dyed with a dye having the general formula

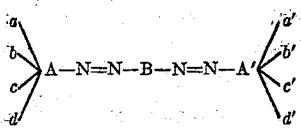

wherein B is a member selected from the group consisting of monocyclic and polycyclic aromatic residues in which the azo bonds shown stand in the 1, 4 position of said aromatic residue, wherein A and A' stand for members selected from the group consisting of aromatic and heterocyclic radicals, wherein $a$ and $a'$ are in a position selected from the group consisting of positions 2 and 4 with respect to the azo groups and are radicals selected from the group consisting of hydroxy, amino, monoalkylamino and arylamino radicals, wherein $b$, $c$, $b'$ and $c'$ are in positions other than the 2 and 4 position with respect to the azo groups and are radicals selected from the group consisting of hydrogen, carboxyl and sulfonic acid radicals and salts of said carboxyl and sulfonic acid radicals, and wherein $d$ and $d'$ are in positions other than the 2 and 4 position with respect to the azo groups and are radicals selected from the group consisting of hydrogen, hydroxy, alkoxy, halogen, amino, alkylamino, arylamino, acylamino and arylazo radicals.

4. A photographic material having at least one light sensitive silver halide layer, comprising a colloid layer dyed with a dye having the general formula

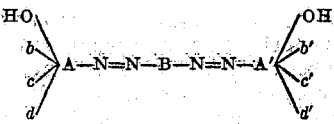

wherein B is a member selected from the group consisting of monocyclic and polycyclic aromatic residues in which the azo bonds shown stand in the 1, 4 position of said aromatic residue, wherein A and A' stand for members selected from the group consisting of aromatic and heterocyclic radicals, wherein the OH radicals are in a position selected from the group consisting of positions 2 and 4 with respect to the azo groups, wherein $b$, $c$, $b'$ and $c'$ are in positions other than the 2 and 4 position with respect to the azo groups and are radicals selected from the group consisting of hydrogen, carboxyl and sulfonic acid radicals and salts of said carboxyl and sulfonic acid radicals, and wherein $d$ and $d'$ are in positions other than the 2 and 4 position with respect to the azo groups and are radicals selected from the group consisting of hydrogen, hydroxy, alkoxy, halogen, amino, alkylamino, arylamino, acylamino and arylazo radicals.

5. A photographic material having at least one light sensitive silver halide layer, comprising a colloid layer dyed with a dye having the general formula

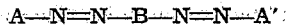

wherein B is a member selected from the group consisting of monocyclic and polycyclic aromatic residues in which the azo bonds shown stand in the 1, 4 position of said aromatic residue, and wherein A and A' represent substituted naphthalene radicals having a radical selected from the group consisting of hydroxy, amino, monoalkylamino and arylamino radicals as a substituent in a position selected from the group consisting of positions 2 and 4 with respect to the azo groups.

6. A photographic material having at least one light sensitive silver halide layer, comprising a colloid layer dyed with a dye having the general formula

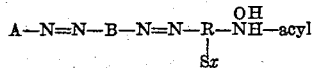

wherein B is a member selected from the group consisting of monocyclic and polycyclic aromatic residues in which the azo bonds shown stand in the 1, 4 position of said aromatic residue, and wherein R stands for the residue of naphthalene in which the OH radical shown is in ortho position to the azo bond linked to said naphthalene residue, S is a member of the group consisting of H and —$SO_3$-cation, $x$ is an integer selected from the group consisting of 1 and 2, and A is a residue of an azo coupler having a hydroxy group in a position selected from the group consisting of positions 2 and 4 with respect to the azo bond linked to the azo coupler and acyl is a residue of an acid selected from the group consisting of carboxylic and sulfonic acids.

7. A photographic material having at least one light sensitive silver halide layer, comprising a colloid layer dyed with a dye having the general formula

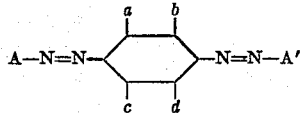

wherein $a$, $b$, $c$ and $d$ are members selected from the group consisting of hydrogen, halogen, alkoxy groups, substituted alkoxy groups, aryloxy groups, alkyl groups, carboxyl groups, sulfo groups and members of a ring, and wherein A and A' are residues of azo coupling components, which azo coupling components carry a substituent selected from the group consisting of hydroxy, amino, monoalkylamino and arylamino radicals, which substituent is a position selected from the group consisting of positions 2 and 4 with respect to the azo group.

8. A photographic material having at least one light sensitive silver halide layer, comprising a colloid layer dyed with a dye having the general formula

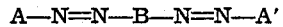

wherein B is a member selected from the group consisting of monocyclic and polycyclic aromatic residues in which the azo bonds shown stand in the 1, 4 position of said aromatic residue, said member B carrying at least one ether residue in which the O is linked directly to the aromatic residue, and wherein A is a residue of an aminonaphthol sulfonic acid containing up to and including two sulfonic groups and in which the hydroxyl group is in one of the positions 2 and 4 with respect to the azo group and A' is a residue of an aminonaphthol sulfonic acid containing up to and including two sulfonic groups and in which the hydroxyl group is in one of the positions 2 and 4 with respect to the azo group, the amino group of at least one of said residues A and A' being acylated with an acid selected from the group consisting of carboxylic and sulfonic acids.

9. A photographic material having at least one light sensitive silver halide layer, comprising a colloid layer dyed with a dye having the general formula

wherein B is a member selected from the group consisting of monocyclic and polycyclic aromatic residues in which the azo bonds shown stand in the 1, 4 position of said aromatic residue, said member B carrying at least one ether residue in which the O is linked directly to the aromatic residue, and wherein A is a residue of an aminonaphthol sulfonic acid derived from a 1,8 aminonaphthol in which the hydroxyl group is in one of the positions 2 and 4 with respect to the azo group and containing up to and including two sulfonic groups, and A' is a residue of an aminonaphthol sulfonic acid derived from a 1,8 aminonaphthol in which the hydroxyl group is in one of the positions 2 and 4 with respect to the azo group and containing up to and including two sulfonic groups, the amino group of at least one of said residues A and A' being acylated with an acid selected from the group consisting of carboxylic and sulfonic acids.

10. A photographic material having at least one light sensitive silver halide layer, comprising a colloid layer dyed with a dye having the general formula

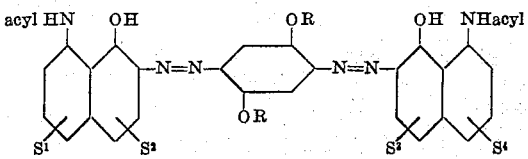

wherein —OR stands for an ether residue, acyl being a residue of an acid of the group consisting of carboxylic and sulfonic acids, $S^1$, $S^2$, $S^3$ and $S^4$ being selected from the group consisting of hydrogen and —$SO_3$-cation, at least one of $S^1$ and $S^2$ and at least one of $S^3$ and $S^4$ respresenting —$SO_3$-cation.

11. A photographic material comprising a light sensitive silver halide layer having incorporated therein a dye having the general formula

A—N=N—B—N=N—A' wherein B is a member selected from the group consisting of monocyclic and polycyclic aromatic residues in which the azo bonds shown stand in the 1, 4 position of said aromatic residue, and wherein A and A' are residues of azo coupling components, which azo coupling components carry a substituent selected from the group consisting of hydroxy, amino, monoalkylamino and arylamino radicals, which substituent is in a position selected from the group consisting of positions 2 and 4 with respect to the azo group.

12. A photographic material having at least one light sensitive silver halide layer, comprising a filter layer having incorporated therein a dye having the general formula

A—N=N—B—N=N—A' wherein B is a member selected from the group consisting of monocyclic and polycyclic aromatic residues in which the azo bonds shown stand in the 1, 4 position of said aromatic residue, and wherein A and A' are residues of azo coupling components, which azo coupling components carry a substituent selected from the group consisting of hydroxy, amino, monoalkylamino and arylamino radicals, which substituent is in a position selected from the group consisting of positions 2 and 4 with respect to the azo group.

13. A photographic material having at least one light sensitive silver halide layer, comprising a colloid layer dyed with a dye having the general formula

A—N=N—B—N=N—A' wherein B is an aromatic residue containing a benzene ring in which the azo bonds shown stand in 1, 4 position, and wherein A and A' are residues of coupling components, which azo coupling components carry a hydroxy substituent in a position selected from the group consisting of positions 2 and 4 with respect to the azo group.

14. A photographic material having at least one light sensitive silver halide layer dyed with a dye having the general formula

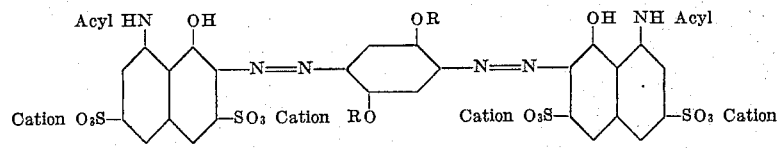

wherein —OR stands for an ether residue in which R is an aliphatic radical, each acyl is a residue of a carboxylic acid at least one of said acyl groups being the residue of a long chained aliphatic carboxylic acid.

15. A process for producing a dye image in a photographic layer containing a metallic silver image and dyed with a dye of the general formula $$A-N=N-B-N=N-A'$$

wherein B is a member selected from the group consisting of monocyclic and polycyclic aromatic residues in which the azo bonds shown stand in the 1, 4 position of said aromatic residue, and wherein A and A' are residues of azo coupling components, which azo coupling components carry a substituent selected from the group consisting of hydroxy, amino, monoalkylamino and arylamino radicals, which substituent is in a position selected from the group consisting of positions 2 and 4 with respect to the azo group which comprises locally destroying said dye by reduction in the presence of said metallic silver image.

BÉLA GASPAR.
PAUL DANIEL DREYFUSS.

REFERENCES CITED

The following references are of record in the file of this patent:

UNITED STATES PATENTS

| Number | Name | Date |
|---|---|---|
| 2,286,714 | Chechak | June 16, 1942 |
| 2,294,892 | Carroll | Sept. 8, 1942 |
| 2,304,884 | Carroll | Dec. 15, 1942 |
| 2,420,631 | Taylor | May 13, 1947 |
| 2,424,066 | Straub et al. | July 15, 1947 |
| 2,470,769 | Gaspar | May 24, 1949 |

FOREIGN PATENTS

| Number | Country | Date |
|---|---|---|
| 14,576 | Great Britain | 1902 |
| 8,569 | Great Britain | of 1914 |
| 541,073 | Great Britain | Nov. 12, 1941 |
| 107,228 | Sweden | Apr. 27, 1943 |
| 551,500 | Great Britain | Feb. 25, 1943 |
| 514,353 | Great Britain | 1949 |